(12) United States Patent  
Crofford

(10) Patent No.: US 12,177,685 B2
(45) Date of Patent: Dec. 24, 2024

(54) RADIO FREQUENCY DESIGN SHEET CHANGE LISTENER FOR WIRELESS NETWORK DOCUMENTS

(71) Applicant: DISH Wireless L.L.C., Englewood, CO (US)

(72) Inventor: Jon William Freeman Crofford, Denver, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 409 days.

(21) Appl. No.: 17/866,352

(22) Filed: Jul. 15, 2022

(65) Prior Publication Data

US 2023/0337010 A1 Oct. 19, 2023

Related U.S. Application Data

(60) Provisional application No. 63/330,646, filed on Apr. 13, 2022.

(51) Int. Cl.
*G06F 7/00* (2006.01)
*G06F 16/11* (2019.01)
*G06F 16/14* (2019.01)
*H04L 41/0859* (2022.01)
*H04L 41/14* (2022.01)
*H04W 16/18* (2009.01)

(52) U.S. Cl.
CPC ........... *H04W 16/18* (2013.01); *G06F 16/113* (2019.01); *G06F 16/148* (2019.01); *H04L 41/0859* (2013.01); *H04L 41/145* (2013.01)

(58) Field of Classification Search
CPC ...... G06F 16/148; G06F 16/113; G06F 16/18; G06F 16/2358; G06F 16/23; H04W 16/18; H04L 41/0859; H04L 41/145
See application file for complete search history.

(56) References Cited

U.S. PATENT DOCUMENTS

| | | | |
|---|---|---|---|
| 2015/0035652 A1* | 2/2015 | Sun | G06K 7/10366 340/10.6 |
| 2019/0266689 A1* | 8/2019 | Williams | G06Q 30/018 |
| 2022/0166454 A1* | 5/2022 | Jaurigue | H04B 17/30 |

* cited by examiner

*Primary Examiner* — Mohammad A Sana
(74) *Attorney, Agent, or Firm* — Seed IP Law Group LLP

(57) ABSTRACT

Embodiments are directed towards providing document change alerts in a cloud-based wireless network system. A list of a plurality of target radio frequency design sheets is obtained. One or more cloud-based folders is then search for the plurality of target radio frequency design sheets. One or more corresponding target radio frequency design sheets are identified during the search. A last-modified date of the corresponding target radio frequency design sheet is compared to a target date. In response to the last-modified date of the corresponding target radio frequency design sheet being more recent than the target date: a most recent version of the corresponding target radio frequency design sheet is maintained and an older version of the corresponding target radio frequency design sheet is archived. A modification notification is then sent to at least one user associated with the corresponding target radio frequency design sheet that changed.

18 Claims, 4 Drawing Sheets

RADIO FREQUENCY DESIGN SHEET CHANGE LISTENER FOR WIRELESS NETWORK DOCUMENTS

TECHNICAL FIELD

The present disclosure relates generally to content management and, more particularly, to detecting changed documents in a cloud-based storage environment.

BACKGROUND

Description of the Related Art

Planning, configuring, and building a wireless network takes numerous people doing numerous different tasks. One task is to define and specify the hardware and wireless technologies being used. A variety of different people and components rely on these specifications. And when one specification changes, it can impact other components or design aspects. Unfortunately, the more people and the more specifications that are needed to develop the network can cause documents to change without notice to others. It is with respect to these and other considerations that the embodiments described herein have been made.

BRIEF SUMMARY

Briefly described, embodiments are directed toward systems and methods of providing document change alerts in a cloud-based wireless network system. A list of a plurality of target radio frequency design sheets is obtained by the system. This list may include a naming convention of target radio frequency design sheets to be searched or specifically name the target radio frequency design sheets to check for updates or changes. One or more cloud-based folders or sub-folders is then search for the plurality of target radio frequency design sheets. One or more corresponding target radio frequency design sheets are identified during the search as matching at least one sheet in the list of sheets. A last-modified date of the corresponding target radio frequency design sheet is compared to a target date, such as the previous date the folder was search for the plurality of target radio frequency design sheets. In response to the last-modified date of the corresponding target radio frequency design sheet being more recent than the target date: a most recent version of the corresponding target radio frequency design sheet is maintained and an older version of the corresponding target radio frequency design sheet is archived. A modification notification is then sent to at least one user associated with the corresponding target radio frequency design sheet that changed. In this way, a variety of users can be notified when a radio frequency design sheet changes, where such changes can impact other aspects of the wireless network design or operation.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
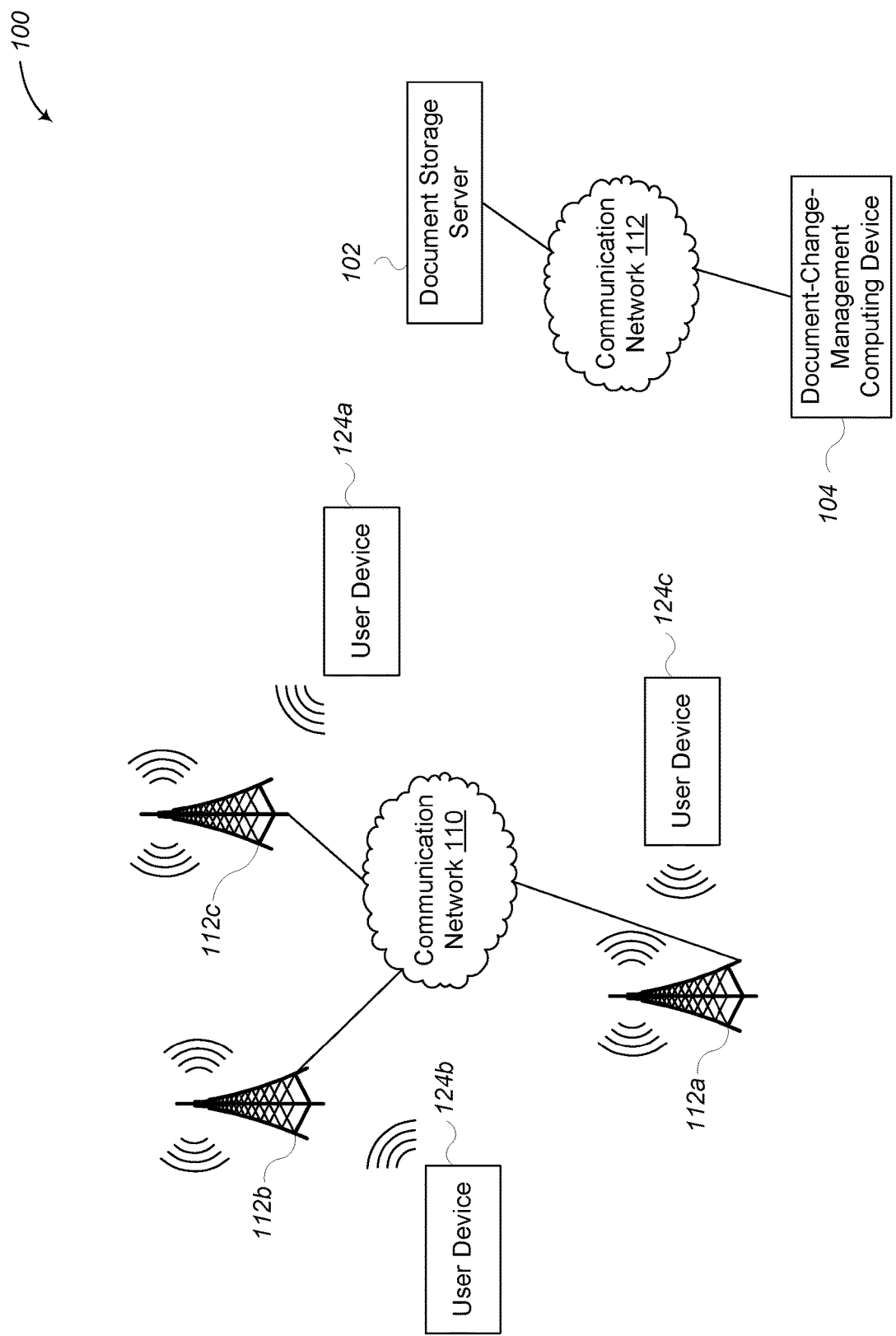
FIG. 1 illustrates a context diagram of an environment for providing radio frequency design sheet change identification in a wireless network in accordance with embodiments described herein.

FIG. 1 illustrates a context diagram of an environment 100 for providing radio frequency design sheet change identification in a wireless network in accordance with embodiments described herein. Environment 100 includes a plurality of cells 112a-112c, a plurality of user devices 124a-124b, a document storage server 102, a document-change-management computing device 104, and a communication network 110.

The user devices 124a-124c are computing devices that receive and transmit cellular communication messages with the cells 112a-112c. Examples of user devices 124a-124c may include, but are not limited to, mobile devices, smartphones, tablets, cellular-enabled laptop computers, or other computing devices that can communication with a cellular network.

The cells 112a-112c are cellular towers that together provide the hardware infrastructure of a cellular communications network, e.g., a 5G cellular communications network. The cells 112a-112c may include or be in communication with base stations, radio back haul equipment, antennas, or other devices, which are not illustrated for ease of discussion.

Each cell 112 provides compatible cellular communications over a coverage area. The coverage area of each cell 112 may vary depending on the elevation antenna of the cell, the height of the antenna of the cell above the ground, the electrical tilt of the antenna, the transmit power utilized by the cell, or other capabilities that can be different from one type of cell to another or from one type of hardware to another. The overall capacity of the network created by the cells 112a-112c depends on the coverage of each cell 112 and the interference that the cells 112 may have on each other, which can be measured by spectral efficiency. In various embodiments, the cells 112a-112c may communicate with each other via communication network 110. Communication network 110 includes one or more wired or wireless networks, which may include a series of smaller or private connected networks that carry information between the cells 112a-112c.

While designing or utilizing the cells 112a-112c to implement the cellular communication network, each cell 112 may be associated with a corresponding radio frequency design sheet. These radio frequency design sheets may be stored in the document storage server 102. The document storage server 102 may be a cloud-based storage environment, which may maintain the radio frequency design sheets in one or more folders or sub-folders. The folders or sub-folders may be arranged such that the radio frequency design sheets for each cell in a particular geographic region are stored in a same folder.

In various embodiments, the radio frequency design sheets may be documents that include a plurality of information that define, list, or identify the hardware components of the corresponding cell, the technical attributes of the corresponding cell, the location of the corresponding cell, the configuration of the cell, or other information. For example, the radio frequency design sheet for a specific cell may identify the cell's identifier, a street address of the cell, GPS coordinates of the cell, the altitude of the antenna of the cell, azimuth or orientation of the cell antenna, the weight of the antenna or radio of the cell, the make or model or brand of the antenna or radio of the cell, the beamwidth of the cell's radio, etc.

When a designer or administrator of the network changes one or more aspects of a cell 112, then the corresponding radio frequency design sheet for that cell is also changed. For example, if the height of the cell's antenna is change, then the corresponding radio frequency design sheet for that cell is changed to indicate the changed antenna height. These changes to the radio frequency design sheets are stored in the document storage server 102.

The document-change-management computing device 104 is configured to perform embodiments described herein to determine if a radio frequency design sheet has changed or been modified and to notify one or more users or administrators of the change. In various embodiments, the document-change-management computing device 104 searches the document storage server 102 for changes in one or more radio frequency design sheets. These searches can be performed at predefined time intervals (e.g., once a day), in response user or administrator request, or at other times.

The document-change-management computing device 104 compares the last-modified date of each radio frequency design sheet with a target date, such as the last day and time the document-change-management computing device 104 performed a search. If the last-modified date of a radio frequency design sheet is more recent than the target date, then that radio frequency design sheet has been modified. If the last-modified date of a radio frequency design sheet is older than the target date, then that radio frequency design sheet has not been modified and can be ignored for the current search.

In response to a radio frequency design sheet change being identified, a notification is generated and sent to one or more administrators or users that are associated with the changed radio frequency design sheet. In at least one embodiment, a user or administrator that is associated with a radio frequency design sheet may be considered the owner of that radio frequency design sheet. In various embodiments, the radio frequency design sheet identifies those individuals, or entities, that are associated with that radio frequency design sheet and should be notified of such changes. In other embodiments, a database may be store a mapping between radio frequency design sheets and its users or administrators that are to be notified of such changes.

Although embodiments described herein refer to radio frequency design sheets, other types of technical specification documents may also be searched for changes.

Figure 2:
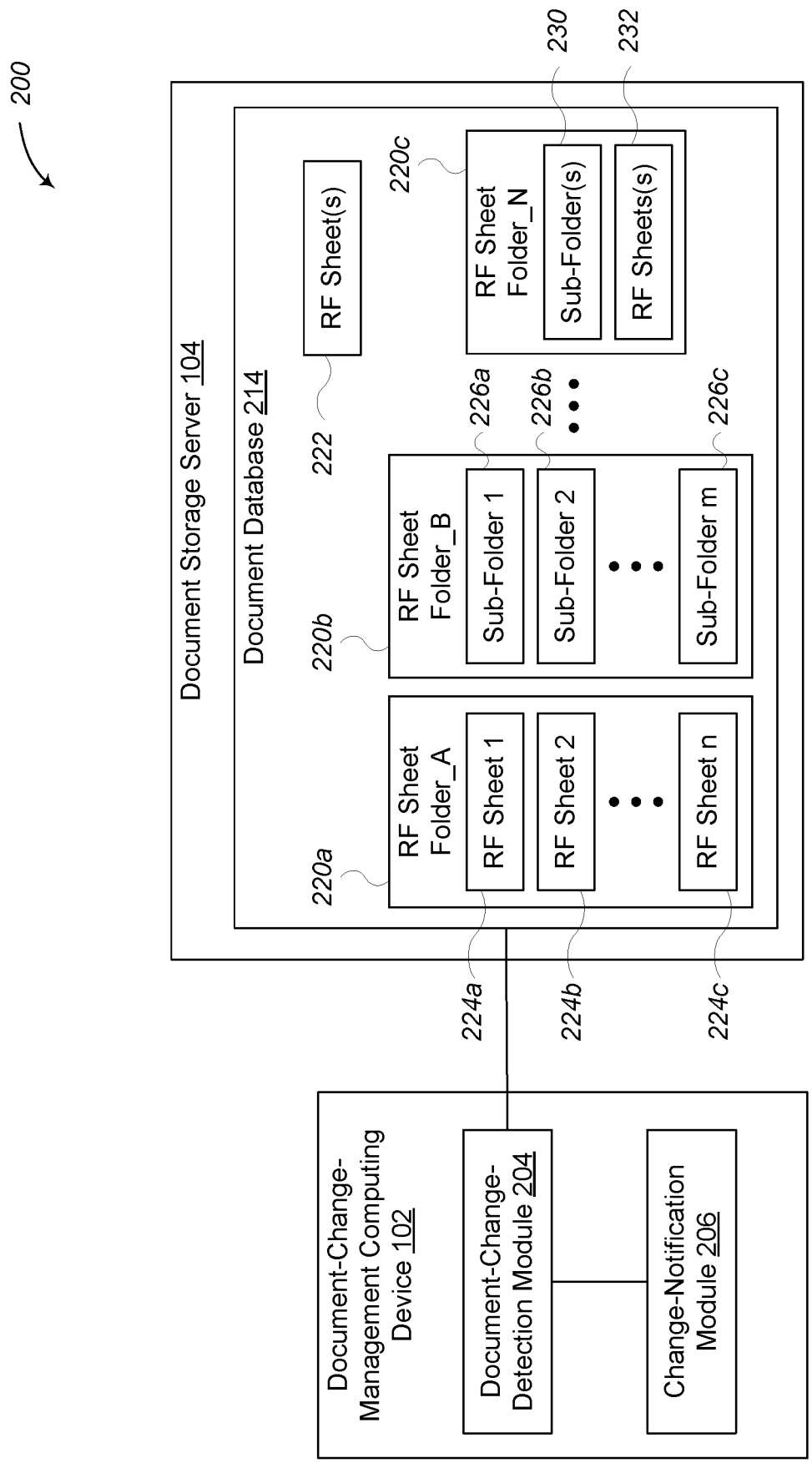
FIG. 2 is a context diagram of a non-limiting embodiment of systems that provide functionality to identify changes in radio frequency design sheets in accordance with embodiments described herein.

FIG. 2 is a context diagram of a non-limiting embodiment of systems that provide functionality to identify changes in radio frequency design sheets in accordance with embodiments described herein. Example 200 includes the document-change-management computing device 102 and document storage server 104, similar to the document-change-management computing device 102 and document storage server 104 shown in FIG. 1.

The document storage server 104 is configured to store a document database 214. The document database 214 may store one or more radio frequency design sheets 222 or one or more folders 220a-220c, or some combination thereof. Each folder 220a-220c may store one or more sub-folders or one or more radio frequency design sheets. For example, folder 220a includes a plurality of RF sheets 224a-224c, folder 220b includes sub-folders 226a-226c, and folder 220c includes one or more sub-folders 230 and one or more radio frequency design sheets 232. As described herein, the radio frequency design sheets 222, the radio frequency design sheets 224a-224c, and the radio frequency design sheets 232 are documents that define various technical aspects of hardware in a cellular communication network.

The document-change-management computing device 102 includes a document-change-detection module 204 and a change-notification module 206. The document-change-detection module 204 communicates with the document storage server 104 and searches the document database 214 for radio frequency design sheet changes, as described herein. When the document-change-detection module 204 detects a changed radio frequency design sheet, the document-change-detection module 204 notifies the change-notification module 206 of the changed sheet. In at least one embodiment, the document-change-detection module 204 may, in addition to determining that a change occurred, capture or obtain the actual change made to the sheet. The change-notification module 206 determines and sends a modification notification to one or more users or administrators associated with the changed radio frequency design sheet. Although the document-change-detection module 204 and the change-notification module 206 are illustrated as separate modules, embodiments are not so limited. Rather, functionality of the document-change-detection module 204 and the change-notification module 206 may be performed by a single module or a plurality of modules.

Figure 3:
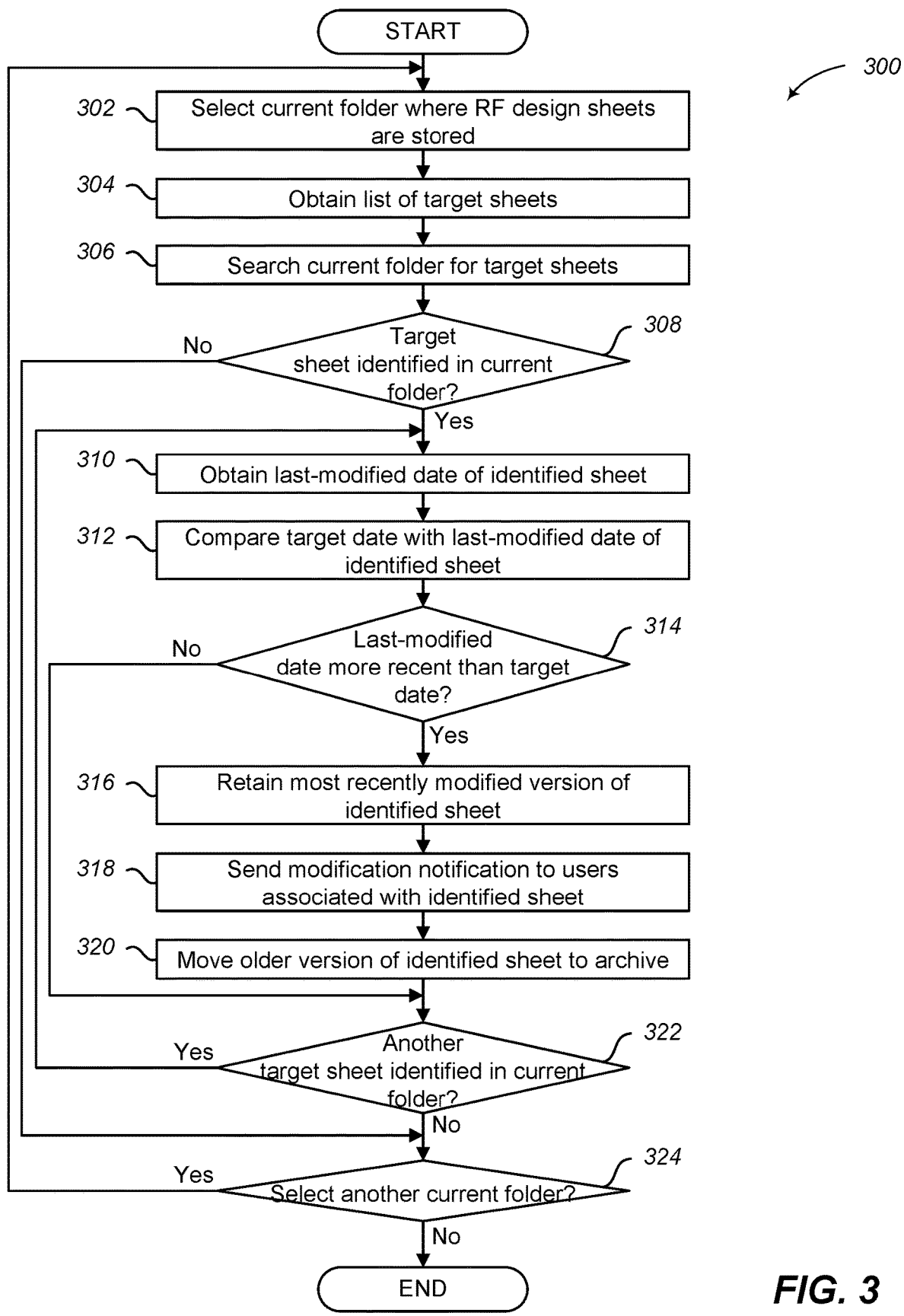
FIG. 3 illustrates a logical flow diagram showing one embodiment of a process for identify changes in radio frequency design sheets in accordance with embodiments described herein.

FIG. 3 illustrates a logical flow diagram showing one embodiment of a process 300 for identify changes in radio frequency design sheets in accordance with embodiments described herein. In at least one of various embodiments, process 300 may be implemented by or executed via circuitry or on one or more computing devices, such as document-change-management computing device 104 in FIG. 1.

Process 300 begins, after a start block, where a current folder is selected where radio frequency design sheets are stored. In some embodiments, the current folder is a folder stored in a cloud-based storage system or environment. In various embodiments, the current folder may be initially selected after the start block as a root directory in which the radio frequency design sheets are stored. In other embodiments, a user or administrator may initially define the current folder after the start block as a particular folder in which radio frequency design sheets are stored, such as a folder that stores radio frequency design sheets for cells in a particular geographic region or section of the cellular network.

Process 300 proceeds to block 304, where a list of target radio frequency design sheets is obtained. In some embodiments, this list may include a naming convention of specific radio frequency design sheets or types of radio frequency design sheets in which to search for changes. In other embodiments, this list may include specific documents names of radio frequency design sheets in which to search for changes.

Process 300 continues at block 306, where the current folder is search for radio frequency design sheets that match at least one target radio frequency design sheet in the list obtained at block 304. In various embodiments, each radio frequency design sheet in the current folder is compared to each listed radio frequency design sheet.

Process 300 proceeds next to decision block 308, where a determination is made whether a target radio frequency design sheet is identified in the current folder. A target radio frequency design sheet is identified when its characteristics, such as document name, match a radio frequency design sheet in the list. If a target radio frequency design sheet is identified during the search, process 300 flows to block 310 for that radio frequency design sheet. If no target radio frequency design sheets are identified during the search, then process 300 flows from decision block 308 to decision block 324.

At block 310, the last-modified date of the identified radio frequency design sheet is obtained, such as from metadata of the radio frequency design sheet.

Process 300 proceeds next to block 312, where the last-modified date of the identified radio frequency design sheet is compared to a target date. In various embodiments, the target date is a day and time the current folder was searched for radio frequency design sheets. For example, if the current folder is searched each day, the target date would be the day immediately preceding the current date of the current search.

Process 300 continues next at decision block 314, where a determination is made whether the last-modified date is more recent than the target date. If the last-modified date of the identified radio frequency design sheet is more recent than the target date, then process 300 flows to block 316; otherwise, process 300 flows to decision block 322.

At block 316, a most recently modified version of the identified radio frequency design sheet is retained.

Process 300 proceeds to block 318, where a modification or change notification is sent, e.g., via an email or text message, to users or administrators associated with the identified radio frequency design sheet. In some embodiments, the identified radio frequency design sheet includes metadata or other information indicating which users are to receive the modification notification. These users may be individual people, groups, entities, etc.

Process 300 continues at block 320, where an older version of the identified radio frequency design sheet is moved to an archive. In various embodiments, the older version is a version of the identified radio frequency design sheet that immediate precedes the modification that resulted in the last-modified date obtained at block 310. Moving the identified radio frequency design sheet to an archive may include copying the identified radio frequency design sheet to a new storage location that is dedicated as an archive.

After block 320, or if the last-modified date of the identified radio frequency design sheet is older than the target date at decision block 314, then process 300 proceeds next to decision block 322.

At decision block 322, a determination is made whether another radio frequency design sheet is identified in the current folder during the search at block 306. If another radio frequency design sheet is identified in the current folder, then process 300 loops to block 310 to obtain the last-modified date of the other identified radio frequency design sheet and determine if the other identified radio frequency design sheet has changed. If another radio frequency design sheet is not identified in the current folder, then process 300 flows to decision block 324.

At decision block 324, a determination is made whether another current folder is selected. In various embodiments, each folder or sub-folder in the cloud-based storage that is storing radio frequency design sheets is selected. In various embodiments, each folder and sub-folder may be systematically selected until each folder is searched for target radio frequency design sheets. If another current folder is selected, process 300 loops to block 302 to select another current folder; otherwise, process 300 terminates or returns to a calling process to perform other actions.

Figure 4:
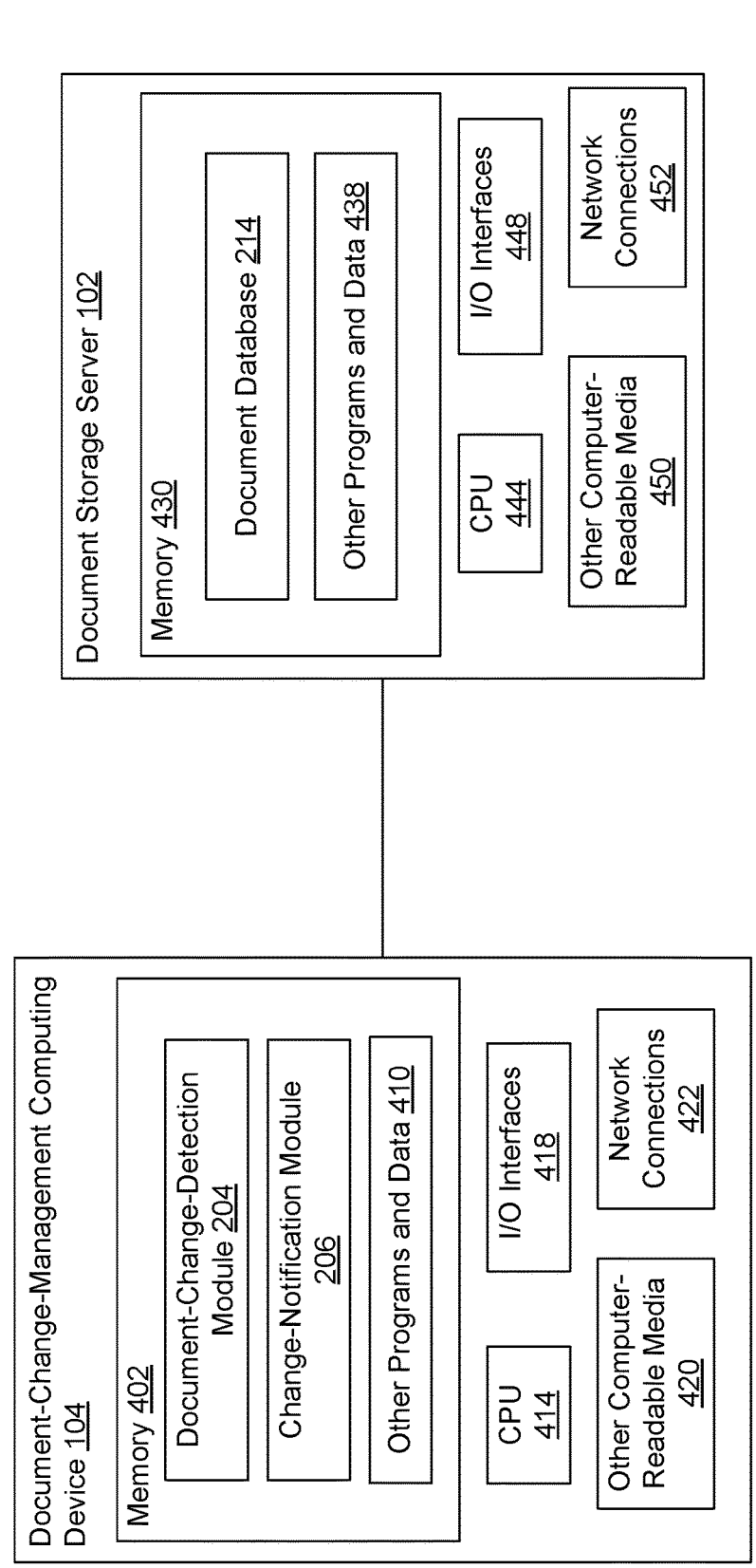
FIG. 4 shows a system diagram that describe various implementations of computing systems for implementing embodiments described herein.

FIG. 4 shows a system diagram that describe various implementations of computing systems for implementing embodiments described herein. System 400 includes a document-change-management computing device 104 and a document storage server 102.

The document-change-management computing device 104 searches through radio frequency design sheets that are stored on the document storage server 102 to determine if any of the stored radio frequency design sheets has changed or been modified since a last search. If a radio frequency design sheet has been changed or modified, then the document-change-management computing device 104 sends a medication notification to one or more users or administrators associated with each changed radio frequency design sheet. One or more special-purpose computing systems may be used to implement document-change-management computing device 104. Accordingly, various embodiments described herein may be implemented in software, hardware, firmware, or in some combination thereof. Document-change-management computing device 104 may include memory 402, one or more central processing units (CPUs)

414, I/O interfaces 418, other computer-readable media 420, and network connections 422.

Memory 402 may include one or more various types of non-volatile and/or volatile storage technologies. Examples of memory 402 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 402 may be utilized to store information, including computer-readable instructions that are utilized by CPU 414 to perform actions, including embodiments described herein.

Memory 402 may have stored thereon document-change-detection module 204 and change-notification module 206. The document-change-detection module 204 is configured to search through one or more folders stored in the document storage server 102 to determine if one or more radio frequency design sheets has changed, as described herein. The document-change-detection module 204 may notify or instruct the change-notification module 206 of each radio frequency design sheet identified as changed. The change-notification module 206 is configured to send a modification notification to one or more users or administrators associated with a changed radio frequency design sheet, as described herein. Memory 402 may also store other programs and data 410.

Network connections 422 are configured to communicate with other computing devices, such as document storage server 102, to facilitate the searching of folders for changed radio frequency design sheets. In various embodiments, the network connections 422 include transmitters and receivers (not illustrated) to send and receive data as described herein. I/O interfaces 418 may include a video interfaces, other data input or output interfaces, or the like. Other computer-readable media 420 may include other types of stationary or removable computer-readable media, such as removable flash drives, external hard drives, or the like.

Document storage server 102 may be a cloud-based storage system or architecture that stores radio frequency design sheets in one or more folder structures, as described herein. One or more special-purpose computing systems may be used to implement document storage server 102. Accordingly, various embodiments described herein may be implemented in software, hardware, firmware, or in some combination thereof. Document storage server 102 may include memory 430, one or more central processing units (CPUs) 444, I/O interfaces 448, other computer-readable media 450, and network connections 452.

Memory 430 may include one or more various types of non-volatile and/or volatile storage technologies similar to memory 402. Memory 430 may have stored thereon document database 214. The document database 214 may store the radio frequency design sheets in a manner that can be changed and search for sheets that have changed. Memory 430 may also store other programs and data 438.

Network connections 452 are configured to communicate with other computing devices, such as document-change-management computing device 104. In various embodiments, the network connections 452 include transmitters and receivers (not illustrated) to send and receive data as described herein. I/O interfaces 448 may include one or more other data input or output interfaces. Other computer-readable media 450 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computing device, comprising:
a memory that stores computer instructions; and
a processor that executes the computer instructions to:
   obtain a list of a plurality of target radio frequency design sheets;
   search a folder for one or more radio frequency design sheets of the plurality of target radio frequency design sheets;
   for each corresponding target radio frequency design sheet identified in the folder during the search:
      compare a last-modified date of the corresponding target radio frequency design sheet to a target date; and
      in response to the last-modified date of the corresponding target radio frequency design sheet being more recent than the target date:
         retain a most recent version of the corresponding target radio frequency design sheet;
         archive an older version of the corresponding target radio frequency design sheet; and
         send a modification notification to at least one user associated with the corresponding target radio frequency design sheet.

2. The computing device of claim 1, wherein the target date is a previous date in which the folder is searched for the plurality of target radio frequency design sheets.

3. The computing device of claim 1, wherein the processor obtains the list of the plurality of target radio frequency design sheets by further executing the computer instructions to:
obtain a naming convention for the plurality of target radio frequency design sheets.

4. The computing device of claim 1, wherein the processor searches the folder for the one or more target radio frequency design sheets by further executing the computer instructions to:
compare each radio frequency design sheet in the folder to a naming convention defined by the list of the plurality of target radio frequency design sheets; and
identify a target radio frequency design sheet in response to a name of the target radio frequency design sheet matching the naming convention.

5. The computing device of claim 1, wherein the processor sends the modification notification to at least one user by further executing the computer instructions to:
select at least one administrator that is an owner of the corresponding target radio frequency design sheet;
generate the modification notification to indicate that the corresponding target radio frequency design sheet has been modified; and
transmit the modification notification to the at least one administrator.

6. The computing device of claim 1, wherein the processor searches the folder for the one or more radio frequency design sheets by further executing the computer instructions to:

search a plurality of folders or sub-folders for the plurality of target radio frequency design sheets.

7. A method, comprising:
obtaining a list of a plurality of target radio frequency design sheets;
searching a folder for one or more radio frequency design sheets of the plurality of target radio frequency design sheets;
for each corresponding target radio frequency design sheet identified in the folder during the search:
comparing a last-modified date of the corresponding target radio frequency design sheet to a target date; and
in response to the last-modified date of the corresponding target radio frequency design sheet being more recent than the target date:
retaining a most recent version of the corresponding target radio frequency design sheet;
archiving an older version of the corresponding target radio frequency design sheet; and
sending a modification notification to at least one user associated with the corresponding target radio frequency design sheet.

8. The method of claim 7, wherein the target date is a previous date in which the folder is searched for the plurality of target radio frequency design sheets.

9. The method of claim 7, wherein obtaining the list of the plurality of target radio frequency design sheets further comprises:
obtaining a naming convention for the plurality of target radio frequency design sheets.

10. The method of claim 7, wherein searching the folder for the one or more target radio frequency design sheets further comprises:
comparing each radio frequency design sheet in the folder to a naming convention defined by the list of the plurality of target radio frequency design sheets; and
identifying a target radio frequency design sheet in response to a name of the target radio frequency design sheet matching the naming convention.

11. The method of claim 7, wherein sending the modification notification to at least one user further comprises:
selecting at least one administrator that is an owner of the corresponding target radio frequency design sheet;
generating the modification notification to indicate that the corresponding target radio frequency design sheet has been modified; and
transmitting the modification notification to the at least one administrator.

12. The method of claim 7, wherein searching the folder for the one or more radio frequency design sheets further comprises:
searching a plurality of folders or sub-folders for the plurality of target radio frequency design sheets.

13. A non-transitory computer-readable medium having contents that, when executed by at least one processor, cause the at least one processor to perform a method, the method comprising:
obtaining a list of a plurality of target radio frequency design sheets;
searching a folder for one or more radio frequency design sheets of the plurality of target radio frequency design sheets;
for each corresponding target radio frequency design sheet identified in the folder during the search:
comparing a last-modified date of the corresponding target radio frequency design sheet to a target date; and
in response to the last-modified date of the corresponding target radio frequency design sheet being more recent than the target date:
retaining a most recent version of the corresponding target radio frequency design sheet;
archiving an older version of the corresponding target radio frequency design sheet; and
sending a modification notification to at least one user associated with the corresponding target radio frequency design sheet.

14. The non-transitory computer-readable medium of claim 13, wherein the target date is a previous date in which the folder is searched for the plurality of target radio frequency design sheets.

15. The non-transitory computer-readable medium of claim 13, wherein obtaining the list of the plurality of target radio frequency design sheets further comprises:
obtaining a naming convention for the plurality of target radio frequency design sheets.

16. The non-transitory computer-readable medium of claim 13, wherein searching the folder for the one or more target radio frequency design sheets further comprises:
comparing each radio frequency design sheet in the folder to a naming convention defined by the list of the plurality of target radio frequency design sheets; and
identifying a target radio frequency design sheet in response to a name of the target radio frequency design sheet matching the naming convention.

17. The non-transitory computer-readable medium of claim 13, wherein sending the modification notification to at least one user further comprises:
selecting at least one administrator that is an owner of the corresponding target radio frequency design sheet;
generating the modification notification to indicate that the corresponding target radio frequency design sheet has been modified; and
transmitting the modification notification to the at least one administrator.

18. The non-transitory computer-readable medium of claim 13, wherein searching the folder for the one or more radio frequency design sheets further comprises:
searching a plurality of folders or sub-folders for the plurality of target radio frequency design sheets.

* * * * *